United States Patent
Numminen et al.

(10) Patent No.: US 6,654,922 B1
(45) Date of Patent: Nov. 25, 2003

(54) METHOD AND APPARATUS FOR DECLARING CORRECTNESS OF RECEPTION OF CHANNELS FOR USE IN A MOBILE TELECOMMUNICATIONS SYSTEM

(75) Inventors: Jussi Numminen, Turku (FI); Antti Toskala, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/546,277

(22) Filed: Apr. 10, 2000

(51) Int. Cl.$^7$ .............................. G08C 25/02; H04L 1/18
(52) U.S. Cl. ...................... 714/748; 714/48; 714/704
(58) Field of Search ................................. 714/758, 748, 714/703, 704, 712, 48

(56) References Cited

U.S. PATENT DOCUMENTS

| | | | |
|---|---|---|---|
| 5,432,778 A | * | 7/1995 | Minde et al. |
| 5,757,810 A | * | 5/1998 | Fall |
| 5,802,105 A | | 9/1998 | Tiedemann, Jr. et al. |
| 6,215,814 B1 | * | 4/2001 | Ylitalo et al. |

FOREIGN PATENT DOCUMENTS

EP 1067730 1/2001

OTHER PUBLICATIONS

"Universal Mobile Telecommunications System (UMTS); Services provided by the Physical Layer (3G TS 25.302 version 3.4.0 Release 1999)" ETSI Technical Report, Mar. 1, 2000, p. 1–56.

"Wideband CDMA for Third Generation Mobile Communications", Ed. T. Ojanpera et al, (1998), Artech House (Boston/London) p. 62.

3G TS 21.101 v2.2.0 (Dec. 1999); 3rd Generation Partnership Project Technical Specification Group Services and System Aspects; 3rd Generation Mobile System Release 1999 Specifications (3G TS 21.101 version 2.2.0).

3G TS 25.212 v3.1.1 (Dec. 1999); 3rd Generation Partnership Project; Technical Specification Group Group Radio Access Network; Multiplexing and Channel Coding (FDD) (3G TS 25.212 version 3.1.0.

3G TS 25.302 v3.4.0 (Mar. 2000); 3rd Generation Partnership Project; Technical Specification Group Radio Access Network; Services Provided by the Physical Layer (Release 1999).

\* cited by examiner

Primary Examiner—Phung M. Chung (57) ABSTRACT

In a mobile telecommunications system, received transport channels are checked for a correct checksum or for a transport format combination indicator (TFCI) and correctness of reception of said channels is declared according to said step of checking. For instance, an operating WCDMA cellular system determines whether the frame reception is correct or if the frame is synchronized by determining whether a CRC checksum is present and correct and, if so, declaring correct reception of the downlink and, if not, determining in the terminal from any transport format combination indicator (TFCI) signal present in the downlink whether a discontinuous transmission (DTX) frame is present or not, and if not, declaring incorrect reception of the downlink, but if so, declaring correct reception of the downlink. Additionally, quality information obtained from the DTX frame can be used in an outer loop power control quality target setting.

13 Claims, 5 Drawing Sheets

METHOD AND APPARATUS FOR DECLARING CORRECTNESS OF RECEPTION OF CHANNELS FOR USE IN A MOBILE TELECOMMUNICATIONS SYSTEM

TECHNICAL FIELD

The present invention relates to mobile telecommunications systems and, in particular, to declaring correctness of frame reception.

BACKGROUND OF THE INVENTION

Basic second generation mobile telecommunications systems such as IS-95 use a cyclic redundancy code (CRC) checksum for out-of-synchronization detection in a mobile terminal of a mobile telecommunications network. If the checksum calculated from the received transmission is not the same as transmitted, then an error is declared, and the uplink can be shut off, for instance. In third generation systems, CRC has been mentioned for use for the same purpose. For instance, the out-of-synchronization condition for WCDMA (wideband code division multiple access) needs to be determined by the terminal. However, using only CRC is not possible for WCDMA, as in IS-95, since there are services without CRC and also services such as AMR (adaptive multi-rate) speech transmit during DTX (discontinuous transmission) frames without CRC information being present. In second generation, the services are mainly speech services, and CRC is used. In third generation, the variety of services is very broad, and there are cases where CRC is not needed.

DISCLOSURE OF INVENTION

The object of the present invention is to use other information to aid not only in the out-of-synchronization detection, but also, in general, for determining or declaring correct or incorrect frame reception by a terminal of a mobile telecommunications network.

According to the invention, received transport channels for a correct checksum or for a transport format combination indicator (TFCI) are checked and correctness of reception of said channels declared according to said CRC check or said TFCI check. Various methods and apparatus for carrying out the invention are shown below in detail.

Thus, the invention can be for use in a terminal of a mobile telephone system having a plurality of base stations capable of communication with the terminal over corresponding radio up and down links, wherein it is determined in the terminal whether in a downlink from a base station to the terminal a cyclic redundancy code checksum is present and correct and if so, correct reception of the downlink is declared and, if not present, it is determined in the terminal from any transport format combination indicator signal present in the downlink from the base station to the terminal whether a discontinuous transmission (DTX) frame is present or not and if not, incorrect reception of the downlink is declared, but, if so, correct reception of the downlink is declared. It is also possible to utilize transmission quality information obtained from the DTX frame for providing an outer loop power control quality target setting signal. The power control quality target setting signal can be provided to the base station in an uplink from the terminal to the base station. The declaration of incorrect/correct reception is for an out-of-synchronization condition or an in-synchronization condition of the downlink.

Another way to carry out the invention is to determine in the terminal whether a downlink from a base station to the terminal contains a zero rate transport format combination indicator (TFCI) for transmission time intervals (TTIs) in a frame and if so, the frame is declared to be in-synchronization, and if not, cyclic redundancy checksums (CRCs) are checked for the TTIs and if at least one is correct, the frame is declared to be in-synchronization. Further, if at least one CRC is not correct, it can be determined in the terminal if dedicated physical control channel (DPCCH) quality and CRC history is over a threshold for an averaging window and if so, the frame can be declared to be in-synchronization and otherwise the frame declared to be out-of-synchronization.

Still another way to carry out the invention is, if a zero rate transport format combination indicator (TFCI) is determined to be present in a transport channel, correct transport block reception is declared, and a block error rate count incremented and, if not, cyclic redundancy codes (CRCs) of transport blocks in a transmission time interval (TTI) are checked, and in the presence of correct CRCs, the block error rate count is incremented.

The present invention advantageously offers criteria for determining correct or incorrect frame reception for all service combinations of a third generation mobile telecommunications system. It is independent of the received signal power level. This method can be used, for instance, for declaring an out-of-synchronization condition, as a block error rate (BLER) indication during DTX frames for outer loop operation, or the like.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 shows a method, according to the invention, for providing a block error rate (BLER) indication during DTX frames for outer loop operation, or the like.

FIG. 5 shows a method, according to the invention, for declaring an in- or out-of-synchronization condition.

BEST MODE FOR CARRYING OUT THE INVENTION

Figure 1:
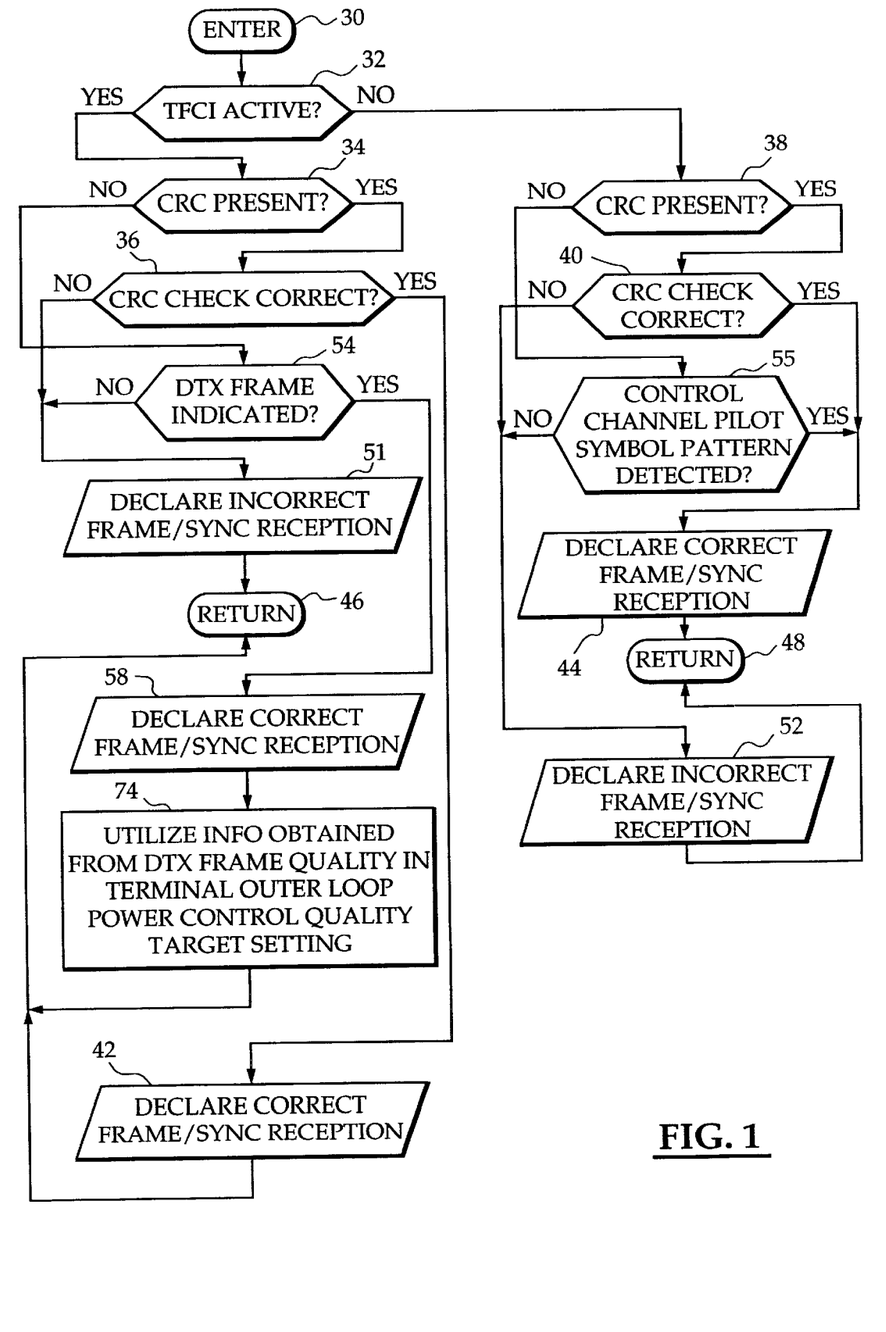
FIG. 1 shows a method, according to the invention, for declaring incorrect/correct frame/sync reception.
Figure 2:
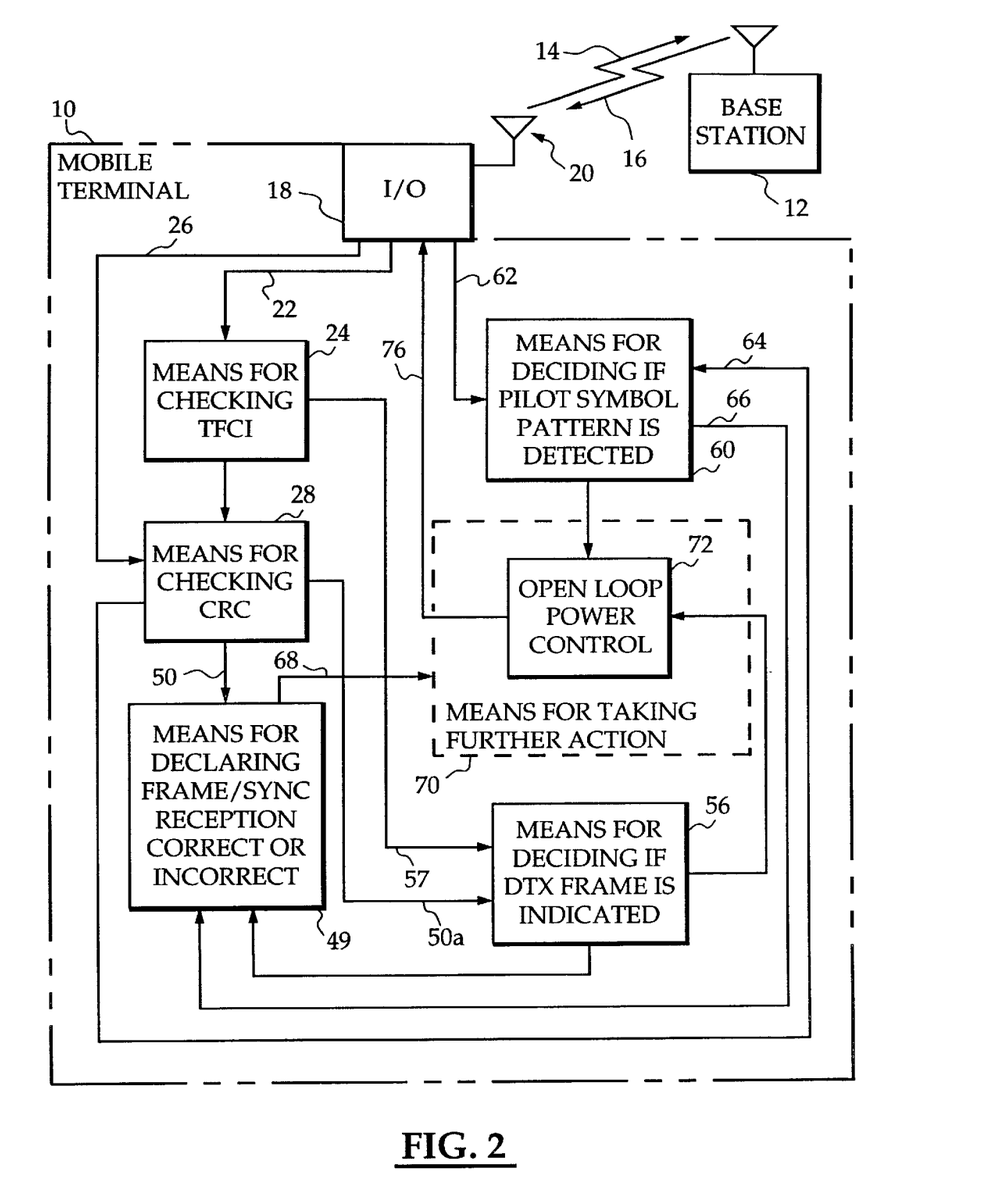
FIG. 2 shows an apparatus for carrying out the method of FIG. 1.

FIG. 1 shows a methodology which may be carried out in a mobile terminal 10 as shown in FIG. 2. The mobile terminal 10 may be in communication with a base station 12 by a radio uplink 14 and downlink 16. The mobile terminal 10 interfaces to a base station 12 part of a new radio access network, called UTRAN (UMTS terrestrial radio access network), which is a conceptual term identifying that part of the network which consists of radio network controllers (RNCS) and nodes (Node Bs) between an interconnection point (Iu) between an RNC and a core network and a radio interface (Uu) between UTRAN and the user equipment (UE). This is the starting point for the third generation mobile phone system UMTS (universal mobile telecommunication system). The architecture of UMTS will include UTRAN for radio access.

One of the modes of UTRA for the user equipment (UE) is the FDD (frequency-division duplex) mode, as distinguished from the time-division duplex (TDD) mode. Although the present disclosure is made in the context of FDD, it should be realized that it could be used in other modes as well, such as TDD. UE radio transmission and reception (FDD) is described in the Technical Specification (TS) 25.101 v 3.1.0 (1999-12), entitled UE Radio Transmission and Reception FFD, of the Third Generation Partnership Project (3GPP) and documents referenced therein. Furthermore, base station radio transmission and reception for UTRA TDD is specified in Technical Specification 25.105, entitled Radio Transmission and Reception. Radio frequency parameters in support of radio resource management for FDD are specified in Technical Specification 25.133, entitled RF Parameters in Support of RRM (FDD). Base station conformance testing for FDD is specified in Technical Specification 25.141, entitled Base Station Conformance Testing (FDD). A general description of the physical layer can be found in Technical Specification 25.201, entitled Physical Layer-General Description. The physical channels and mapping of transport channels onto physical channels for FDD is specified Technical Specification 25.211, entitled Physical Channels and Mapping of Transport Channels on Physical Channels (FDD), Multiplexing and channel coding are specified in Technical Specification 25.212, entitled Multiplexing and Channel Coding (FDD). Spreading and modulation for FDD are specified in Technical Specification 25.213, entitled Spreading and Modulation (FDD), while physical layer procedures for FDD are specified in Technical Specification 25.214, entitled FDD: Physical Layer Procedures. Physical layer measurements are specified in Technical Specification 25.215, entitled Physical Layer; Measurements (FDD). A complete list of 3GPP specifications can be found at 3G TS 21.101, entitled 3rd Generation Mobile System Release 1999 specifications.

In particular, Chapter 7 of Technical Specification 25.302, entitled Services Provided by the Physical Layer (Release 1999), relating to "services provided by the physical layer" deals with a transport format combination indicator (TFCI) in sub-sections 7.1.6 through 7.1.12 thereof. In Spec. 3G TS 25.212, entitled "Multiplexing and Channel Coding (FDD)", the relevant, section is 4.2 and FIG. 2, which shows DTX, and Sec. 4.2.9, which also discusses DTX. According to the present invention, as disclosed further below, TFCI is useful for carrying out the objects thereof.

Upon reception by an input/output (I/O) unit 18 of a signal from the downlink 16 via an antenna 20, the mobile terminal 10 provides the downlink signal on a line 22 to a means 24 for checking for a transport format combination indicator (TFCI) signal and on a line 26 to a means 28 for checking for a cyclic redundancy code. It should be understood that the signals on the lines 22, 26 may be the same signal and are indicative of one or more parameters of the downlink 16. The mobile terminal may have a signal processor comprising a general purpose or special purpose central processing unit, memory, and other hardware known in the art for processing such incoming signals. Such processing would be carried out according to a set of stored instructions which would be coded, for instance, according to the flowchart of FIG. 1.

Referring now to FIG. 1, after entering in a step 30, a decision is made by the means 24 of FIG. 2, for instance, as to whether there is a TFCI signal present or active. If there is a TFCI signal present or active, a step 34 is executed, for instance, by the means 28 of FIG. 2 to determine if a CRC code is present or not and, if so, determining in a step 36 whether the CRC checksum is correct or not. Similar, parallel steps 38, 40 are carried out if it were found that the TFCI is not present or active in the step 32. If it is determined in the step 36 or in the step 40 that the CRC checksum is correct, either a step 42 or a parallel step 44 is executed to declare correct frame reception or, for instance, correct synchronization, followed by a return step 46, 48, respectively. The declaration is made by means 49 of FIG. 2 which is responsive to a signal on a line 50 from the means 28 indicative of whether the CRC checksum is present or correct or not.

If, on the other hand, it is found that the CRC code is not correct in the step 36 or in the step 40, a corresponding step 51 or 52 is carried out to declare incorrect frame reception or synchronization, followed by a corresponding return step 46, 48. Again, the declaration can be made by the means 44 of FIG. 2.

If it were determined in step 34 or in the step 38 that CRC is not present, then a step 54 or a step 55 is carried out. According to the step 54, a determination is made from the TFCI whether a DTX frame is indicated or not. Such can be carried out by means 56 shown in FIG. 2 which is responsive to a signal on a line 57 indicative of whether DTX is present and a signal on a line 50a indicative of CRC not being present. If DTX is not indicated, then the step 51 is executed to declare incorrect frame reception or an out-of-synchronization condition, followed by a return 46. Alternatively (if TFCI is not active), the pilot symbol detection of step 55 can take place by means of means 60 (shown in FIG. 2) for deciding if a pilot symbol pattern is detected or not. The means 60 may be responsive to an input signal on a line 62 coupled from the I/O device 18 for detection purposes. The means for checking CRC 28 may also provide a signal on a line 64 to the means 60 to indicate that CRC is not present. The means 60 may then provide an output signal on a line 66 to the means 49. The means 49 for declaring frame/sync reception correct or incorrect may then provide an output signal on a line 68 to means 70 for taking further action.

Such further action may take the form, for instance, of an outer loop power control 72, which is capable of carrying out a step 74 such as shown in FIG. 1, whereby information obtained from the DTX frame quality is utilized in the terminal outer loop power control quality target setting provided on a line 76 to the I/O means 18 for transmission to the base station 12 via the uplink 14. As known in the art, the outer loop constitutes the base station periodically reducing the transmitted power to the mobile station. The mobile station measures the frame error ratio (FER) and when it exceeds a predefined limit, typically 1%, the mobile station requests additional power from the base station every 15–20 milliseconds. It is also called a downlink slow power control. See paragraph 2.4.3.3 at page 62 of "Wideband CDMA for Third Generation Mobile Communications" by Ojanper äet al, ARTECH House, 1998.

It should be realized that there are other ways to carry out the invention, other than those explicitly shown. For instance, the step 32 of FIG. 1 need not be the first step to be executed. The CRCs of TTIs of active transport channels of step 36 can be executed first, followed by checking for active TFCI if the calculated checksum is no as indicated. Other variations in the sequence of steps shown in FIG. 1 are, of course, possible.

Figures 3, 5:
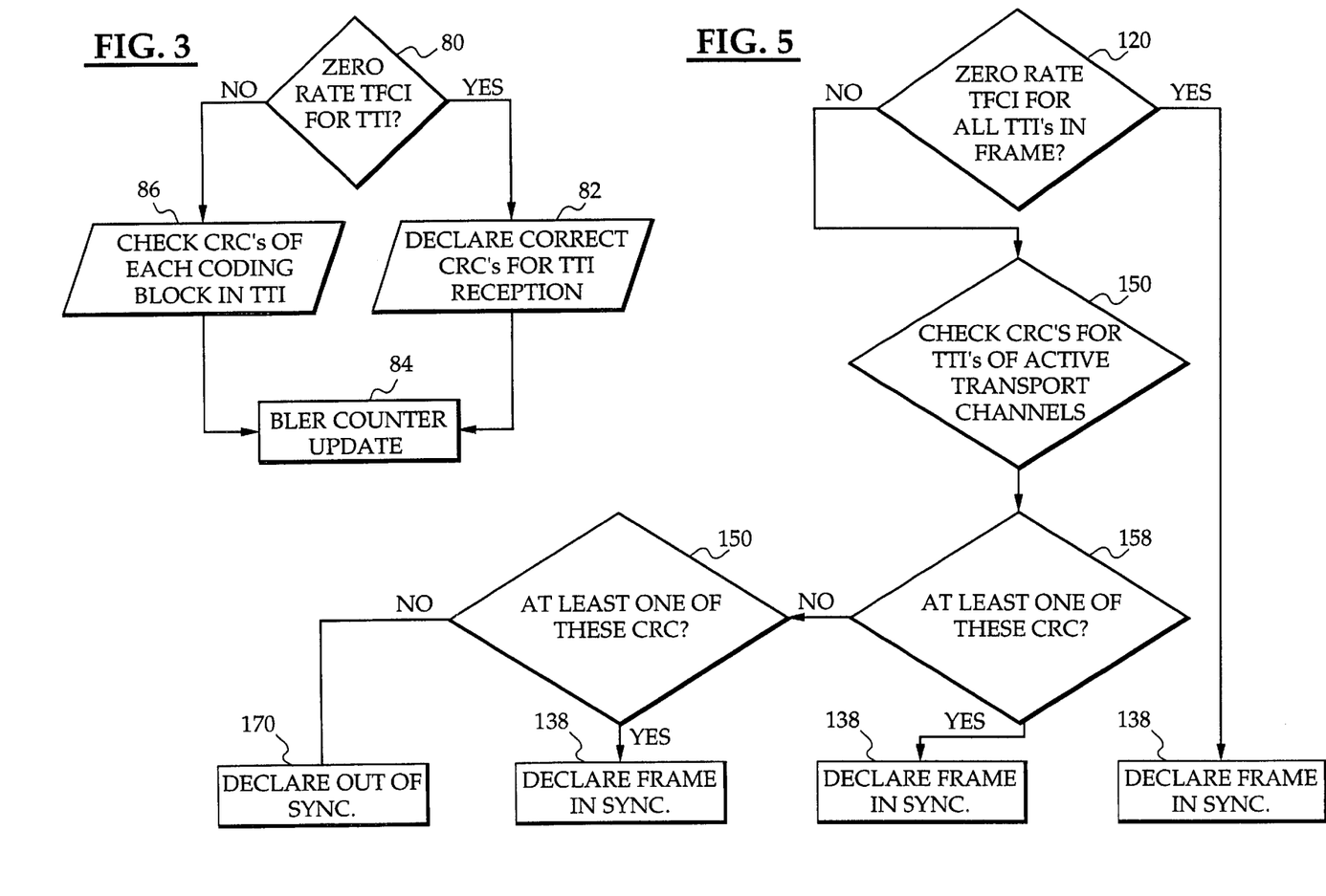
Figure 4:
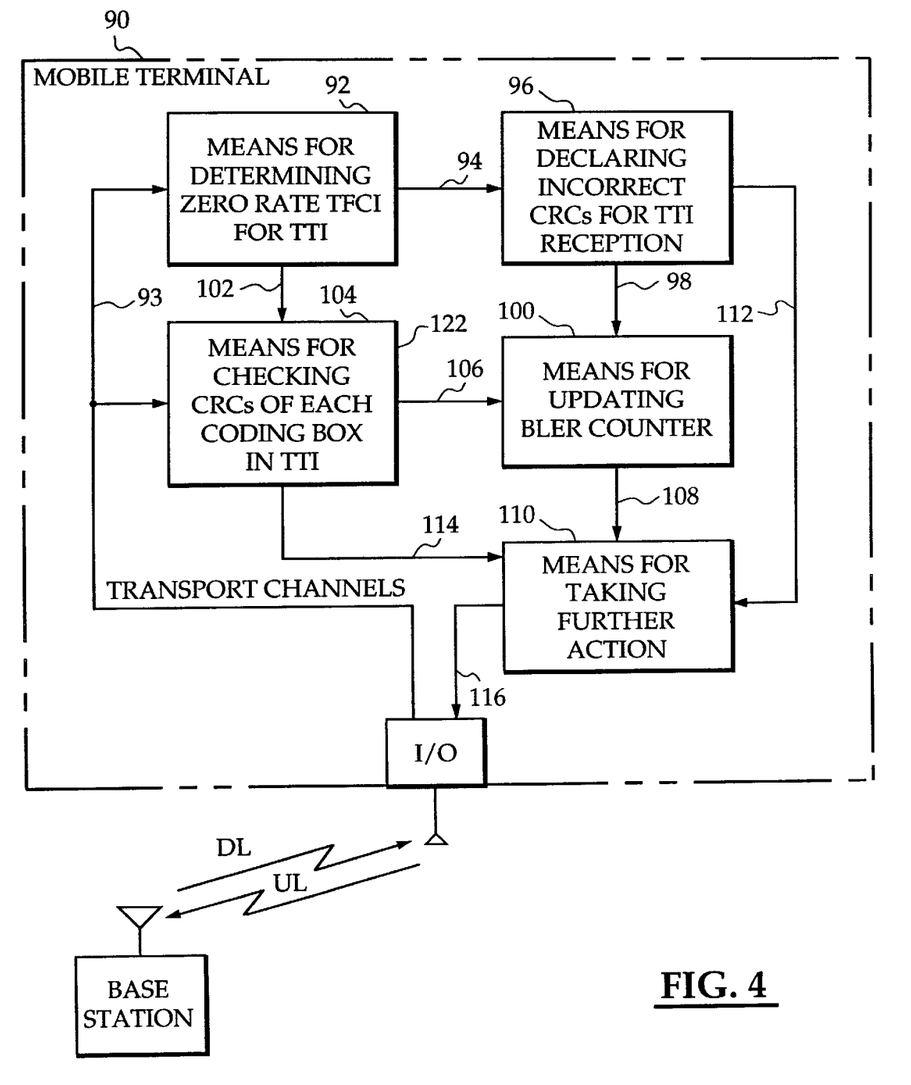
FIG. 4 shows an apparatus for carrying out the method of FIG. 3.

For another instance, a method is shown in FIG. 3 for providing a block error rate (BLER) indication using the TFCI as well as CRC. In the flowchart of FIG. 3, the TFCI is used for BLER indication/determination, as well as for out-of-synchronization detection. It should be mentioned that a BLER counter as shown counts correct (coming from the YES branch) and incorrect/correct (coming from the NO branch) CRC bits. It counts the number of erroneous blocks. After determining in a step 80 that a zero rate TFCI is present for a transmission timing interval (TTI), correct TTI reception is declared in a step 82 and a BLER counter is updated. "Zero rate" means that the TFCI indicates that no user data is transmitted on a certain transport channel, i.e., DTX is active. In that case, it assumed that TFCI information will be received correctly, since separate coding is used to TFCI information. Therefore, it can be decided that an in-synchronization state exists even though DTX is active and the terminal is not receiving actual user data. On the other hand, if a zero rate TFCI is not determined in the step 80, the CRCs of each coding block in the TTI is checked in a step 86, followed by execution of the BLER counter update step 84. FIG. 4 shows an apparatus 90 for carrying out the method of FIG. 3. Means 92 is responsive to transport channels with transport blocks in standardized transmission time intervals (TTIs) on a line 93 incoming from a downlink DL from a base station via an Input/Output (I/O) device. The means 90 is for determining the presence of a zero rate TFCI for a TTI provides and a confirmation signal on a line 94 in the presence thereof. A means 96 for declaring incorrect CRCs for TTI reception does so and provides a signal on a line 98 to a means 100 for updating a BLER counter. This corresponds to the step 86 determining incorrect CRCs and updating the BLER counter in the step 84. In step 86, the main point of interest is to know the number of erroneous blocks, so the result for finding correct CRCs is not shown. However, if the error percentage were important, the correct,CRCs would have to be counted as well. If the means 92 does not determine that a zero rate TFCI is present for the TTI, it instead provides a signal on a line 102 to a means 104 for checking CRCs of each transport (coding) block in the TTI. After checking, the means 104 provides a signal on a line 106 to the means 100 for updating the BLER counter. The means 100 for updating the BLER counter or the BLER counter itself, may provide a signal on a line 108 indicative of the BLER count or of the count exceeding a limit to a means 110 for taking further action. Similarly, the means 96, 104 may provide signals on lines 112, 114, respectively, to the means 110 for taking further action and it may in turn provide an output signal on a line 116 for transmission on an uplink UL to the base station.

Figure 6:
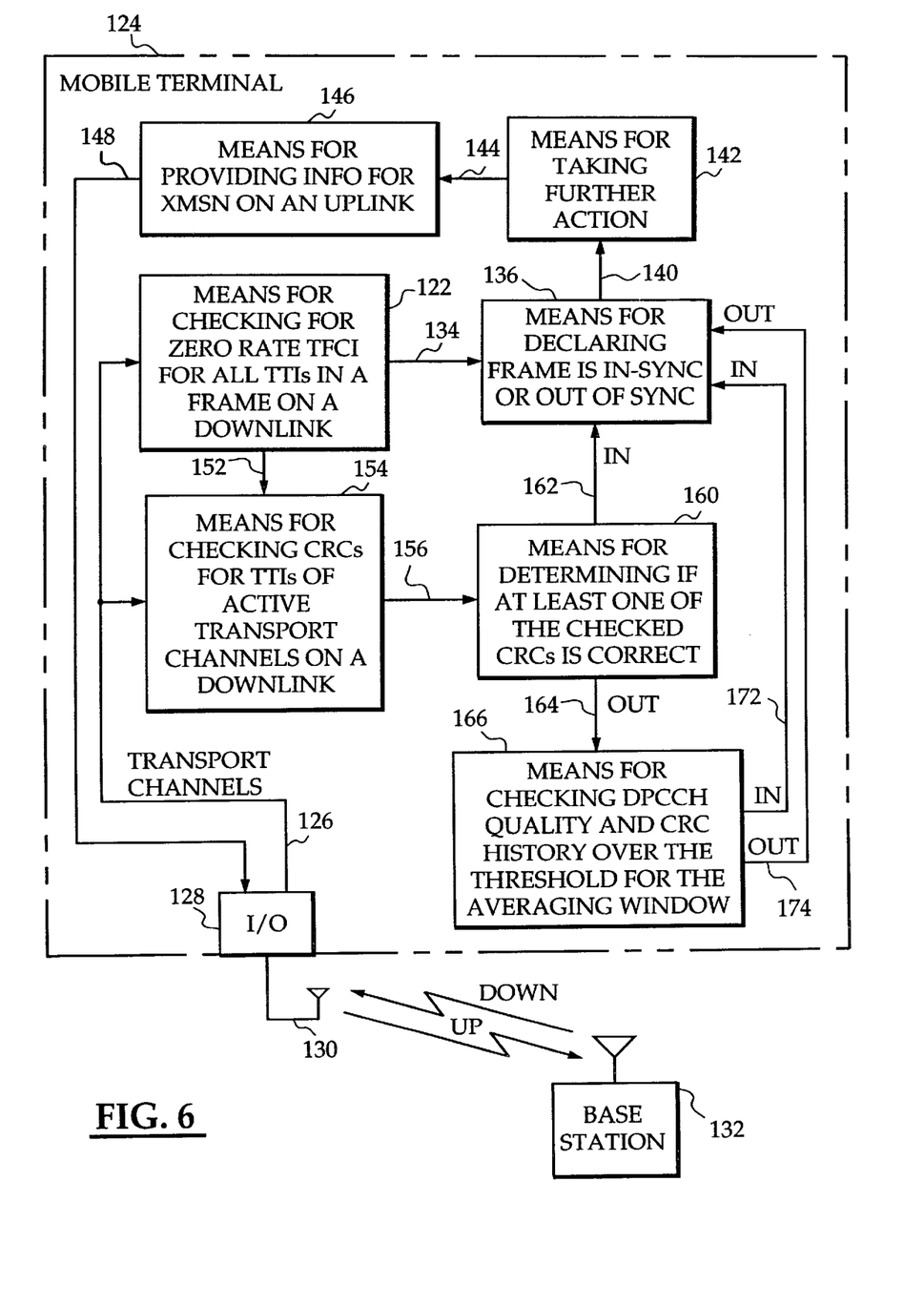
FIG. 6 shows an apparatus for carrying out the method of FIG. 5.

Similar to FIG. 1, FIG. 5 shows a method for declaring frames of TTI transport blocks in-synchronization or out-of-synchronization. A determination is made in a step 120 as to whether a zero rate TFCI is present for all TTIs in a frame. As shown in FIG. 6, this determination may be carried out in a means 122 in a mobile terminal 124. The means 124 is responsive to transport channels on a line 126 from an input/output (I/O) device 128 of the mobile terminal 124 and checks for a zero rate TFCI for all TTIs in a frame. The I/O device 128 may be connected to an antenna 130 and have a duplexer (not shown) for bidirectional communication over an uplink and a downlink with a base station 132. If present, it provides a confirmation signal on a line 134 to a means 136 for declaring that a frame is in-synchronization or not. The means 136 corresponds to and is for carrying out a step 138 as shown in FIG. 5. After declaring the synchronization status, the means 136 may provide a signal on a line 140 indicative of said status to a means 142 for taking further action. This further action may be confined to and carried out entirely within the mobile terminal 124, or may lead to provision by the means 142 of a signal on a line 144 to means 146 for providing information for transmission on an uplink to a base station. If so, the means 146 provides a signal on a line 148 to the I/O means 128 which in turn provides the information on the uplink to the base station 132. On the other hand, if in executing the step 120 of FIG. 5 it is determined that a zero rate TFCI is not present for all TTIs of a frame, a step 150 is executed instead of step 138. This is signalled by the means 122 of FIG. 6 providing a negative confirmation signal on a line 152 to a means 154 for checking CRCs for TTIs of active transport channels. The step 150 determines whether CRCs of TTIs of active transport channels are correct or not. The means 154 provides, a correctness signal on a line 156 indicative of the result of the checking step 150. If at least one is correct, as determined in a step 158, the step 138 is executed to declare the frame in-synchronization. The step 158 may be carried out by means 160 of FIG. 6 that is responsive to the signal on the line 156 for providing an in-synchronization signal on a line 162 to the means 136 or an out-of-synchronization signal on a line 164 to a means 166 for checking dedicated physical control channel (DPCCH) quality and CRC history over a threshold for an averaging window. The UE is required to monitor DPCCH quality in order to detect a loss of the signal on Layer 1 (see 3G TS 25.01, Sec. 6.4.4). DPCCH quality is to be determined as Ec/Ior in decibels where Ec/Ior is average transmit energy per PN chip for different fields or physical channels to the total transmit power spectral density. CRC history means maintaining information concerning whether correct CRC values have been received. The averaging is done over several transmission time intervals (TTIs). This is because it should not definitely be decided that an out-of-synchronization situation exists if a CRC or a certain TTI is incorrect. The CRC history and DPCCH quality should be studied over a longer period to make a final decision. This is shown by a step 168 of FIG. 5 and, depending on the result of the decision of the step 168, the frame is declared to be in-synchronization in the step 138 or out-of-synchronization in a step 170. The means 166 of FIG. 6 for carrying out step 168 provides an IN signal on a line 172 and an OUT signal on a line 174 indicative thereof to the means 136 for declaring whether the frame is in-synchronization or out-of-synchronization.

From the foregoing, it will be appreciated that the invention can be applied in many different ways, and that although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for use in a mobile telecommunications system, comprising the steps of declaring correctness of reception of some transport channels according to a step of checking for a selected transport format combination indicator (TFCI) and for other transport channels according to a step of determining a correct checksum.

2. The method of claim 1, for use in a terminal of said mobile telephone system having a plurality of base stations capable of communication with said terminal over corresponding radio up and down links, wherein said steps of declaring, checking and determining comprise the steps of determining in said terminal whether in a downlink from a base station to said terminal a cyclic redundancy checksum is present and correct and if so declaring correct reception of said downlink and, if not present, determining in said terminal from any transport format combination indicator signal present in said downlink from said base station to said terminal whether a discontinuous transmission (DTX) frame is present or not and if not, declaring incorrect reception of said downlink, but, if so, declaring correct reception of said downlink.

3. The method of claim 2, further comprising the step of utilizing transmission quality information obtained from said DTX frame for providing an outer loop power control quality target setting signal.

4. The method of claim 3, wherein said power control quality target setting signal is provided to said base station in an uplink from said terminal to said base station.

5. The method of claim 2, wherein said step of declaring correctness of reception is for declaring in out-of-synchronization condition or an in-synchronization condition of said downlink.

6. Apparatus for use in a mobile telecommunications system, comprising
   means, responsive to transport channels received over a radio link, for checking a transport format combination indicator (TFCI),
   means, also responsive to said transport channels received over said radio link, for checking said received transport channels for a correct checksum,
   each of said foregoing means for providing a check indication signal indicative of a result of said checking, and
   means responsive to said check indication signals from said foregoing means for declaring correctness of reception of said channels by providing declaration signals.

7. The apparatus of claim 6 for use in a terminal of said mobile telecommunications system having a plurality of base stations capable of communication with said terminal over corresponding radio up and downlinks, wherein said means for checking and said means of declaring comprise means for checking in said terminal whether in a downlink from a base station to said terminal a cyclic redundancy checksum is present and correct, means for declaring correct reception of said downlink if said checksum is correct, means for checking, in case said checksum is not present, from any transport format combination indicator signal present in said downlink from said base station to said terminal whether a discontinuous transmission (DTX) frame is not present or not, means for declaring incorrect reception of said downlink if a DTX frame is present or for declaring correct reception of said downlink if said DTX frame is present.

8. The apparatus of claim 7, further comprising means for utilizing transmission quality information obtained from said DTX frame for providing an outer loop power control quality target setting signal.

9. The apparatus of claim 8, wherein said power control quality target setting signal is provided to said base station in an uplink from said terminal to said base station.

10. The apparatus of claim 7, wherein said means for declaring incorrect reception and said means for declaring correct reception are for declaring an out-of-synchronization condition and an in-synchronization condition, respectively, of said downlink.

11. The method of claim 1, for use in a terminal of said mobile telephone network having a plurality of base stations capable of communication with said terminal over corresponding radio up and down links, wherein said steps of checking and declaring comprise the steps of checking in said terminal whether a downlink from a base station to said terminal contains a zero rate transport format combination indicator (TFCI) for all transmission time intervals (TTIs) in a frame and if so declaring said frame in-synchronization, and if not checking cyclic redundancy codes (CRCs) for said TTIs and if at least one is correct declaring said frame in-synchronization and, if at least one CRC is not correct, declaring said frame out-of-synchronization.

12. The method of claim 11, wherein if said at least one CRC is not correct, determining in said terminal if dedicated physical control channel (DPCCH) quality and CRC history is over a threshold for an averaging window and if so declaring said frame in-synchronization.

13. The method of claim 1, wherein said steps of checking and declaring comprise the steps of determining if a zero rate transport format combination indicator (TFCI) is present in a transport channel and, if so, declaring correct transport block reception followed by incrementing a block error rate count and, if not, checking cyclic redundancy codes (CRCs) of transport blocks in a transmission time interval (TTI) and in the presence of correct CRCS, incrementing said block error rate count.

* * * * *

UNITED STATES PATENT AND TRADEMARK OFFICE
CERTIFICATE OF CORRECTION

PATENT NO. : 6,654,922 B1
DATED : November 25, 2003
INVENTOR(S) : Numminen et al.

It is certified that error appears in the above-identified patent and that said Letters Patent is hereby corrected as shown below:

Column 3,
Line 27, after "(FDD)",","" should be -- . --.
Line 36, after "Layer", ";" should be deleted.
Line 36, after "Measurements", "(FDD)" should be delete.

Column 5,
Line 35, after "correct", "," should be deleted.

Column 6,
Line 15, after "provides", "," should be deleted.

Signed and Sealed this

Sixth Day of July, 2004

JON W. DUDAS
*Acting Director of the United States Patent and Trademark Office*